(Model.)

J. PECH.
EARTHENWARE VESSEL.

No. 280,661. Patented July 3, 1883.

WITNESSES
Wm. A. Skinkle
Alfred C. Newman

By his Attorneys
Baldwin, Hopkins & Peyton

INVENTOR
Joseph Pech.

UNITED STATES PATENT OFFICE.

JOSEPH PECH, OF MACOMB, ILLINOIS.

EARTHENWARE VESSEL.

SPECIFICATION forming part of Letters Patent No. 280,661, dated July 3, 1883.

Application filed January 2, 1883. (Model.)

*To all whom it may concern:*

Be it known that I, JOSEPH PECH, of Macomb, McDonough county, Illinois, have invented certain new and useful Improvements in Earthenware Vessels, of which the following is a specification.

My invention consists in providing an earthenware vessel with feet formed integral therewith, which are so shaped that they will strengthen the vessel, and will not be easily knocked off or broken.

Figure 1:
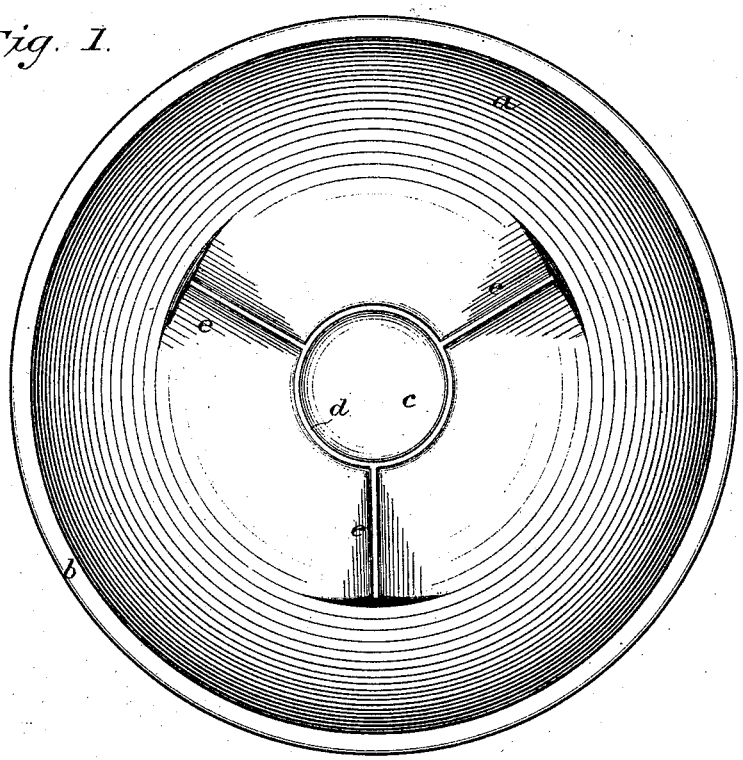
Figure 2:
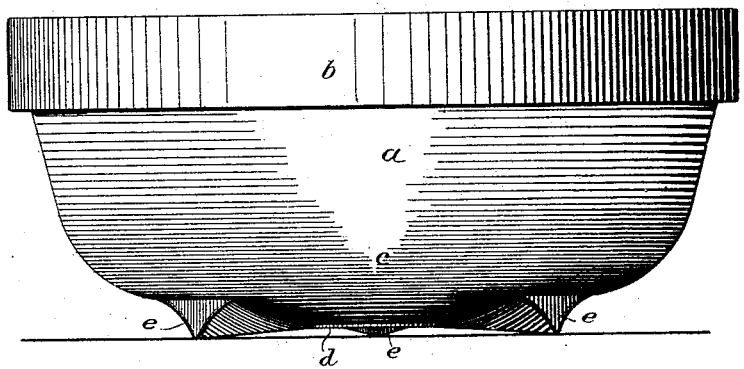

In the accompanying drawings, Figure 1 is a view of the bottom of my improved vessel, and Fig. 2 an elevation of the same.

The vessel $a$ is nearly hemispherical in shape, and is preferably formed with a re-enforced rim, $b$. The bottom $c$ is slightly flattened, and is formed with a central annular ridge, $d$, from which radiate a series of elongated feet, $e$. The feet $e$ are formed integral with the bottom of the vessel, and consist of ridges which extend from the central ridge, $d$, out to near the end of the flattened bottom. The top lines of the ridges incline slightly upward from the ridge $d$, and the sides slant gradually down and merge into the body of the vessel. The depth of the ridges is greatest at their outer ends and decreases toward their inner ends. The outer ends of the ridges are triangular in cross-section, and are rounded off, so as to leave no sharp edges or corners.

My improved earthenware vessel may be formed at a single molding, and it is glazed and baked in the usual manner. The sloping sides of the feet re-enforce the bottom of the vessel, and the feet are firmly seated, and present no sharp edges or corners which would be liable to chip off. The feet hold the vessel steadily in position and permit the free circulation of air under it.

The vessel above described is designed especially for holding milk in the heating process of raising cream; but it may obviously be used for other purposes.

I claim as my invention—

1. A vessel formed with horizontally-elongated feet radiating from a common center and increasing in depth outward, substantially as described.

2. A vessel formed with horizontally-elongated feet triangular in cross-section, and which radiate from a common center, with a slight inclination from end to end, and gradually increase in depth from the center outward, substantially as set forth.

JOSEPH PECH.

Witnesses:
 WM. H. NEECE,
 J. T. NEECE.